US010227205B2

(12) United States Patent
Delneo (10) Patent No.: US 10,227,205 B2
(45) Date of Patent: *Mar. 12, 2019

(54) WINDABLE REEL ASSEMBLY (71) Applicant: STANLEY BLACK & DECKER, INC., New Britain, CT (US)

(72) Inventor: John Delneo, Middletown, CT (US)

(73) Assignee: STANLEY BLACK & DECKER, INC., New Britain, CT (US)

( * ) Notice: Subject to any disclaimer, the term of this patent is extended or adjusted under 35 U.S.C. 154(b) by 719 days.

This patent is subject to a terminal disclaimer.

(21) Appl. No.: 14/835,365

(22) Filed: Aug. 25, 2015

(65) Prior Publication Data

US 2015/0360906 A1  Dec. 17, 2015

Related U.S. Application Data (63) Continuation of application No. 13/791,050, filed on Mar. 8, 2013, now Pat. No. 9,207,058.

(Continued)

(51) Int. Cl.
G01B 3/10 (2006.01)
B65H 75/48 (2006.01)
(Continued)

(52) U.S. Cl.
CPC ........... B65H 75/30 (2013.01); B65H 75/486 (2013.01); G01B 3/1005 (2013.01);
(Continued)

(58) Field of Classification Search
CPC .... B65H 75/30; B65H 75/486; G01B 3/1041; G01B 3/1005; G01B 2003/103
(Continued)

(56) References Cited

U.S. PATENT DOCUMENTS 1,057,543 A  4/1913  Green
1,110,759 A  9/1914  Earll
(Continued)

FOREIGN PATENT DOCUMENTS

DE  2444053 A1  4/1975
JP  2001-031334 A  2/2001

OTHER PUBLICATIONS

Search Report and Search Opinion as issued in European Patent Application No. 131845091, dated Dec. 10, 2013.

Primary Examiner — Christopher W Fulton
(74) Attorney, Agent, or Firm — Pillsbury Winthrop Shaw Pittman LLP (57) ABSTRACT A reel assembly includes a housing, an axle within the housing, a reel within the housing, a first spring and a second spring. The housing has a fixed connection portion. The fixed connection portion is fixed from rotation relative to the housing. The axle is configured to rotate about an axis of rotation. The reel is configured to rotate about the axis of rotation and the axle. The first spring is coupled between the axle and the fixed connection portion of the housing. The second spring is coupled between the axle and the reel. The second spring has a torque profile associated therewith different from a torque profile of the first spring. Rotation of the reel relative to the housing in a direction tending to tension the second spring transmits rotational movement to the axle through the tensioning of the second spring. Such rotational movement of the axle is applied to the first spring to tension the first spring.

20 Claims, 3 Drawing Sheets

Related U.S. Application Data (60) Provisional application No. 61/703,062, filed on Sep. 19, 2012.

(51) Int. Cl.
*G01B 5/04* (2006.01)
*B65H 75/30* (2006.01)

(52) U.S. Cl.
CPC .......... *G01B 3/1041* (2013.01); *G01B 3/1056* (2013.01); *G01B 3/1082* (2013.01); *G01B 2003/103* (2013.01); *G01B 2003/1043* (2013.01)

(58) Field of Classification Search
USPC ................. 33/755, 754, 761, 769; 242/372
See application file for complete search history.

(56) References Cited

U.S. PATENT DOCUMENTS

| | | | |
|---|---|---|---|
| 1,204,217 A | 11/1916 | Weaver | |
| 1,209,341 A | 12/1916 | Schultz | |
| 1,235,092 A | 7/1917 | Atkinson et al. | |
| 1,933,925 A | 3/1931 | Norling | |
| 2,437,786 A | 3/1948 | Oberdorf et al. | |
| 2,543,176 A | 2/1951 | Komassa | |
| 2,869,801 A | 1/1959 | Foster | |
| 2,997,251 A | 8/1961 | Chafin | |
| 3,033,316 A | 5/1962 | Foster | |
| 3,630,104 A | 12/1971 | Milner | |
| 4,232,837 A | 11/1980 | Cutler et al. | |
| 4,382,563 A | 5/1983 | Morita et al. | |
| 4,506,446 A | 3/1985 | Mitchell | |
| 4,527,334 A | 7/1985 | Jones et al. | |
| 4,993,657 A | 2/1991 | Brown | |
| 5,033,202 A | 7/1991 | Chen | |
| 5,195,693 A | 3/1993 | Sasaki et al. | |
| 6,098,757 A | 8/2000 | Stephenson | |
| 6,243,964 B1 | 6/2001 | Murray | |
| 6,643,947 B2 | 11/2003 | Murray | |
| 6,715,214 B1 | 4/2004 | Lin | |
| 6,766,588 B1 | 7/2004 | Hsu | |
| 6,811,109 B1 | 11/2004 | Blackman et al. | |
| 6,964,114 B1 | 11/2005 | Chen | |
| 7,559,154 B2 | 7/2009 | Levine et al. | |
| 7,717,156 B2 | 5/2010 | Costello et al. | |
| 8,793,890 B2 * | 8/2014 | Delneo | G01B 3/1041 33/769 |
| 9,207,058 B2 * | 12/2015 | Delneo | G01B 3/1041 |
| 2007/0101599 A1 | 5/2007 | Levine et al. | |
| 2008/0263886 A1 | 10/2008 | Kang | |
| 2010/0212175 A1 | 8/2010 | Choi | |
| 2011/0099828 A1 | 5/2011 | Hernandez | |
| 2012/0260514 A1 | 10/2012 | Delneo et al. | |
| 2014/0075772 A1 * | 3/2014 | Delneo | G01B 3/1041 33/754 |

* cited by examiner

WINDABLE REEL ASSEMBLY

This application is a continuation of U.S. Pat. No. 9,207,058, filed on Mar. 8, 2013, which claims priority and benefit under 35 U.S.C. § 119(e) to U.S. Provisional Patent Application Ser. No. 61/703,062, filed Sep. 19, 2012. The aforementioned applications are incorporated herein by reference in their entirety.

FIELD

The present patent application relates generally to windable reel assemblies.

BACKGROUND

Windable reel assemblies, such as tape measures, are often configured to receive a length of windable material having measuring gradations thereon, wound around a reel, so as to store the material in a compact form. The windable material may be unwound from the reel, for use thereof. While the windable material can be in the form of a thin metal tape (including but not limited to a blade or measuring tape), other windable materials can be used. While some windable reel assemblies are configured to be manually wound, other windable reel assemblies are configured as retractable, with a spring bias configured to automatically wind the windable material onto the reel. An example of this latter configuration may be found in U.S. Pat. No. 6,643,947, incorporated herein by reference in its entirety.

In some windable reel assemblies, to support a spring torque that facilitates complete retraction, the spring may occupy more space (e.g., it may be wider or longer) than what is desired.

In some other windable reel assemblies, to ensure complete retraction of the windable material therein, the spring may require a large torque profile, which may overcome friction of the windable material as it winds onto the reel. For example, some windable materials may generally have a concave configuration, so as to resist deformation along a length of the windable material as it is extended from the reel. As the windable material is further wound around the reel, the concave configuration in interior windings of the windable material may flatten due to the force applied from exterior windings of the windable material. Such flattening of the otherwise concave configuration may further cause frictional resistance to winding or unwinding the windable material. The longer the windable material extraction from a stored state, the more progressive the torque demand to retract the windable material around the reel, and the greater the spring torque profile required to ensure complete retraction. It may be appreciated that excessive spring torque beyond that required to overcome frictional resistance of the windable member may result in a higher retraction speed than what might be desired.

Among other things, the present application relates to an improved windable reel assembly.

SUMMARY

According to one aspect of this disclosure, a reel assembly is provided. The reel assembly includes a housing, an axle within the housing, a reel within the housing, a first spring and a second spring. The housing has a fixed connection portion. The fixed connection portion is fixed from rotation relative to the housing. The axle is configured to rotate about an axis of rotation. The reel is configured to rotate about the axis of rotation and the axle. The first spring is coupled between the axle and the fixed connection portion of the housing. The second spring is coupled between the axle and the reel. The second spring has a torque profile associated therewith different from a torque profile of the first spring. Rotation of the reel relative to the housing in a direction tending to tension the second spring transmits rotational movement to the axle through the tensioning of the second spring. Such rotational movement of the axle is applied to the first spring to tension the first spring.

According to another aspect of this disclosure, a reel assembly is provided. The reel assembly includes a housing, a reel, a first spring, and a second spring. The housing has a fixed connection portion. The fixed connection portion is fixed from rotation relative to the housing. The reel is configured to rotate relative to the housing. The first spring is coupled between the fixed connection portion and a spring coupling member. The second spring is coupled between the spring coupling member and the reel. The spring coupling member includes an intermediate member configured to at least partially surround the first spring; and an axle portion extending from the intermediate member. The axle portion provides a mounting surface for the second spring. Rotation of the reel relative to the housing in a direction tending to tension the second spring transmits rotational movement to the spring coupling member through the tensioning of the second spring. Such rotational movement of the spring coupling member is applied to the first spring to tension the first spring.

According to another aspect of this disclosure, a measuring tape rule device. The measuring tape rule device includes a reel; a first spring; a second spring; a coupling member coupled between the first spring and the second spring; and a tape blade having gradations thereon and wound on the reel. Extension or retraction of the tape blade causes associated rotational movement of the first spring, the second spring, and the coupling member. The rotational movement of the second spring is applied to the first spring through the coupling member.

These and other objects, features, and characteristics of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only, and are not intended as a definition of the limits of the present patent application. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of the tape measure in accordance with one or more embodiments are shown in the drawings, in which like reference numerals designate like elements. The drawings form part of this original disclosure in which.

DETAILED DESCRIPTION

Figure 1:
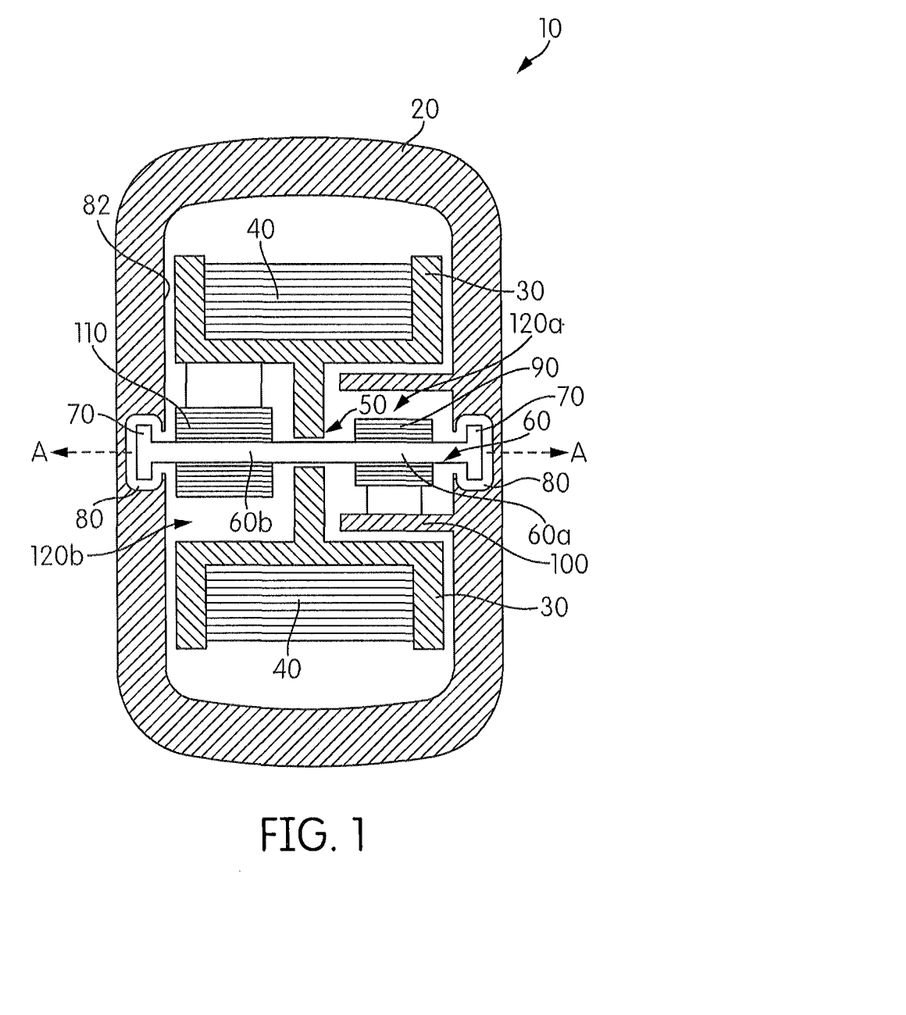
FIG. 1 is a cross-sectional view of an embodiment of a reel assembly of the present disclosure.

FIG. 1 illustrates a cross sectional view of a reel assembly 10, disclosed in this embodiment in connection with a tape measure device. The reel assembly 10 includes a housing 20 configured to support a rotatable reel 30 therein. It may be appreciated that a tape or windable member 40 may be wound around the reel 30. The windable member 40 may be of any appropriate construction or configuration. Accordingly, as used herein, the term "tape" or "windable material" can refer to a variety of different constructions or materials, some of which may be arranged to carry or display gradations that have been applied to a surface thereof, by any appropriate manner.

In various embodiments, gradations may be applied to the surface of the windable material by paint, etching, stenciling, combinations thereof, or through other applicable processes. In some embodiments the housing 20 may enclose the reel 30 (e.g., substantially surrounds the reel 30). Such enclosure of the reel 30 by the housing 20, may be such that the windable member 40 is retractable from the reel 30 (and thus the housing 20). For example, in an embodiment the housing 20 may include an opening through which the windable member 40 can be extended outside the housing 20.

Conventionally tape measures have such an opening, so the windable member (i.e., the tape) thereof may be pulled from a portion extending from the opening (e.g., a tape hook coupled to the windable member), to extend the windable member from the housing. An example of such a tape measure is disclosed in U.S. Pat. No. 8,793,890, which is incorporated herein by reference in its entirety. The windable member 40 of the reel assembly 10 may be of any appropriate construction or configuration, including but not limited to being a tape, or a cable, having measurement gradations thereon. Likewise the housing 20 may be of any appropriate construction or configuration. For example, in an embodiment the housing 20 may be formed from metal, plastic, or any other appropriate material, and may be integrally formed or may comprise an assembly. For example, in an embodiment the housing 20 may be formed from clamshell halves or other discrete components that are secured together to surround the reel 30 (and the windable member 40 when wound around the reel 30). Such securing together of the components of the housing 20 may be by any appropriate mechanism, including but not limited to being secured by fasteners, snap fitting together, being adhered or otherwise fused together, or so on.

As shown, the reel 30 may contain an aperture 50 therein, and through which a rotatable axle 60 may extend through. The rotatable axle 60 may extend along an axis of rotation (axis "A") common to the reel 30 and the rotatable axle 60. As shown, in the embodiment of FIG. 1, the rotatable axle 60 may include one or more connection portions 70. In the shown embodiment, the connection portions 70 are on both opposite end portions of the rotatable axle 60. In another embodiment, it is contemplated that only one end of the rotatable axle 60 need be provided with a connection portion 70. The connection portion 70 enables the rotatable axle 60 to be rotatably coupled to the housing 20. In the illustrated embodiment, the connection portions 70 are in the form of flanged portions that are received in corresponding receptacles 80 in the interior surface 82 of the housing 20. It may be appreciated that the flanged portions 70 being received in the receptacles 80 may prevent or constrain undesired movement or displacement between the reel 30 and the rotatable axle 60 relative to the housing 20, while allowing for rotation of both within the housing 20.

Coupling the rotatable axle 60 to the housing 20 is a first spring 90. As shown, the first spring 90 may have one end portion thereof connected to a first side 60a of the rotatable axle 60, and an opposite end portion thereof connected to a connection portion 100 fixed relative to the housing 20. In some embodiments, such as that illustrated, the connection portion 100 may be integrally formed with the housing 20. Other configurations are alternatively possible. For example, connector portion 100 may be a separately formed structure that is connected, fastened, or joined to the interior surface 82 of the housing 20. In an embodiment, the first spring 90 may comprise a flat spiral spring, which may be wound around the first side 60a of the rotatable axle 60, with one end secured to the first side 60a, and the opposite end secured to the connection portion 100. In an embodiment, the flat spiral spring, or other configurations of the first spring 90, may comprise spring steel. It may be appreciated that other configurations of the first spring 90 are alternatively possible.

The reel assembly 10 further includes a second spring 110 coupled between the rotatable axle 60 and the reel 30. Specifically, the second spring 110 may have one end portion thereof connected to a second side 60b of the rotatable axle 60, and the opposite end portion thereof connected to the reel 30. As shown in the illustrated embodiment, the second spring 110 may comprise a flat spiral spring which may be wound around the second side 60b of the rotatable axle 60, with one end secured to the second side 60b, and the opposite end secured to the reel 30.

In an embodiment, the first spring 90 has a first end (outer end) connected to the connection portion 100, and a second end (inner end) connected to the rotatable axle 60. The first spring 90 is wound counterclockwise from the outside connection to the inside connection when viewed from the right side of FIG. 1 (viewed along the axis A. The second spring 110 has a first end (outer end) connected to the reel 30 and its second end (inner end) connected with the axle. The spring 110 is wound clockwise from the outside connection to the inside connection when viewed from the right side of FIG. 1 (viewing along the axis A).

In an embodiment, the second spring 110 has a lower spring constant (k) so as to apply a lower winding force than the first spring 90, which has a greater spring constant (k). In other embodiments, however, the second spring 110 may have a greater spring constant (k) than the first spring 90. Such a configuration may be utilized because the springs are coupled in series, so the weaker spring, having a lower spring constant (k), will unwind before the stronger spring having a greater spring constant (k), in embodiments where the two spring constants differ.

It may be appreciated that the first spring 90 and the second spring 110 may be coupled to one another, to the reel 30, and to the housing 20 (through the connection portion 100) in such a manner so as to transfer turns of the reel 30 from one spring to the other. For example, the first spring 90 may be wound around the rotatable axle 60 in an opposite direction to the second spring 110. Such a coupling allows the reel assembly 10 to store turns on both the first spring 90 and the second spring 110, where available potential turns for the reel 30 is through a combination of turns on each of the first spring 90 and the second spring 110. It may be appreciated that by linking the first spring 90 and the second spring 110 in this manner, the reel assembly 10 may be formed in a compact arrangement. For example, in one embodiment, a diameter of first and second spring chambers 120a and 120b of the reel assembly 10 (i.e., the spaces of the reel assembly 10 where the first spring 90 and second spring 110 respectively reside) may be smaller than a comparable spring chamber housing a single larger spring wound therein to maintain the same amount of potential energy for retracting the windable member 40. This may be accomplished because the first spring 90 and the second spring 110 may each have a smaller diameter, and be positioned alongside one another (e.g., sharing a common axis), facilitating a housing 20 having spring chambers that are defined by the smaller diameter of each of the first spring 90 and the second spring 110, while a single larger spring would necessitate a single larger spring chamber defined by the larger diameter of the larger spring.

In the illustrated embodiment the spring chambers 120a and 120b are positioned within the reel 30, and thus the springs 90 and 110 are themselves located within the reel 30. Specifically, the first spring chamber 120a is defined by a side of the reel 30 surrounding the first side 60a of the rotatable axle 60, while the second spring chamber 120b is defined by a side of the reel 30 surrounding the second side 60b of the rotatable axle 60. While in the illustrated embodiment the first spring chamber 120a and the second spring chamber 120b are positioned entirely within the reel 30, in other embodiments, spring chambers associated with the first spring 90 and/or the second spring 110 may be located elsewhere in the reel assembly 10. For example, the first spring 90 and/or the second spring 110 may be located completely within, partially within, or outside of a volume defined by the extremities of the reel 30.

In some embodiments, the spring chambers 120a and 120b may be sized based on the spring therein. For example, in an embodiment where each of the spring chambers 120a and 120b are defined by the reel 30, the spring chambers 120a and 120b may be sized based on the first spring 90 and/or the second spring 110. While in some embodiments the first spring 90 and the second spring 110 may be of similar construction or configuration (albeit with opposite direction of winding in the illustrated embodiment), in other embodiments, the first spring 90 and the second spring 110 may have different characteristics from one another, depending on a desired performance over a cycle of retraction. For example, the material, torque profile, thickness, hardness, and width of the flat configuration of spring may differ from the first spring 90 and the second spring 110. As described in greater detail below, such varied configuration may facilitate a faster retraction of the windable member 40 during the initial retraction, however a slower retraction of the windable member 40 thereafter. For example, where the windable member 40 is terminated by a hook (e.g., a tape hook on a measuring tape blade), a slower subsequent retraction may reduce an amount of force placed on the hook when the hook engages the housing 20 to prevent further retraction.

During operation of the reel assembly 10, it may be appreciated that as the reel 30 is turned (e.g., when extending the windable member 40), the second spring 110 is tensioned from the exterior of the diameter of the second spring 110 (e.g., pulling from the outside end of the second spring 110 to tension the second spring 110), which in turn drives the rotatable axle 60 in the same rotational direction as the reel 30. This movement of the rotatable axle 60 is thus transferred to the first spring 90, tensioning the first spring 90 around the rotatable axle 60 from the interior of the diameter of the first spring 90 (e.g., pulling from the inside end of the first spring 90 to tension the first spring 90). The reel assembly 10 therefore stores rotations of the reel 30 on both the first spring 90 and the second spring 110 as the windable member 40 is extended. When the windable member 40 is released, the reel 30 and rotatable axle 60 of the reel assembly 10 would spin under the force of the first spring 90 and the second spring 110, retracting the windable member 40 to be wound around the reel 30.

Figure 2:
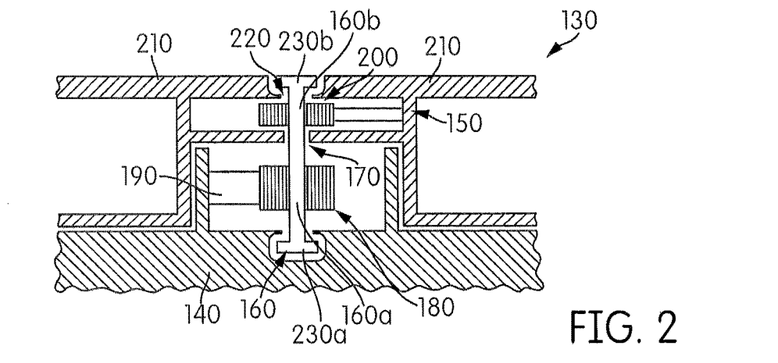
FIG. 2 illustrates a cross-sectional view of another embodiment of a reel assembly of the present disclosure.

In some embodiments, the reel may be configured to be supported alongside the housing. For example, FIG. 2 illustrates an embodiment of a reel assembly 130 comprising a housing 140 configured to support a reel 150 alongside the housing 140. Similarly to the reel assembly 10, the reel assembly 130 includes a rotatable axle 160 configured for rotation relative to the housing 140. Specifically, the rotatable axle 160 may extend through an aperture 170 formed in the reel 150. Additionally, a first spring 180 couples a first side 160a of the rotatable axle 160 to a connection member 190 fixed relative to the housing 140. The connection member 190 may be generally similar to the connection portion 100 of the reel assembly 10, and accordingly, may be formed integrally to the housing 140, or may be otherwise secured thereto. As second spring 200, analogous to the second spring 110 of the reel assembly 10, may be coupled between a second side 160b of the rotatable axle 160 and the reel 150. As shown, in an embodiment the reel 150 may be held adjacent to the housing 140 by the rotatable axle 160. Specifically, in the illustrated embodiment, the reel 150 may include axle engaging portion 210, with an aperture 220 therein configured to receive the rotatable axle 160. As shown, each end of the rotatable axle 160 may include flanged portions 230 (e.g., flanged portion 230a associated with the first side 160a and flanged portion 230b associated with the second side 160b). Accordingly, engagement between the flanged portion 230b of the rotatable axle 160 and the smaller diameter of the aperture 220 may limit movement of the reel 150 away from the rotatable axle 160. Additionally, engagement between the flanged portion 230a of the rotatable axle 160 and the housing 140, such as that shown, may limit movement of the reel 150 (and the rotatable axle 160) away from the housing 140. Other mechanisms to support the reel 150 adjacent to the housing 140 are alternatively possible in other embodiments.

Figure 3:
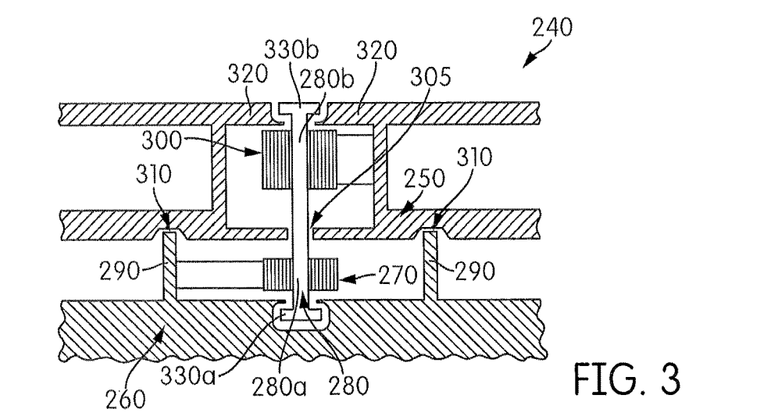
FIG. 3 illustrates a cross-sectional view of another embodiment of a reel assembly of the present disclosure.

As indicated above, in various embodiments one or more of the springs may be positioned outside of the volume defined by the reel. For example, FIG. 3, illustrates an embodiment of a reel assembly 240 comprising a reel 250 configured to be supported alongside a housing 260. As shown, in the illustrated embodiment, the reel 250 may be shaped so that a first spring 270 configured to couple a rotatable axle 280 to the housing 260 (e.g., via a connection member 290). As shown, the connection of the first spring 270 may be through a first side 280a of the rotatable axle 280. A second spring 300 may accordingly be coupled between a second side 280b of the rotatable axle 280 and the reel 250. As shown, the rotatable axle 280 may extend through an aperture 305 formed in the reel 250. As shown, the connection member 290 may be configured to engage a groove 310 formed in the reel 250, so as to limit pivotal motion between the reel 250 and the housing 260. While in some embodiments the connection member 290 may have a post-configuration, in other embodiments, such as that illustrated, the connection member 290 may have an annulus configuration, so as to provide at least two areas of contact between the groove 310 of the reel 250 and connection member 290. It may be appreciated that in embodiments where the connection member 290 includes a post-configuration a second post may be positioned spaced from the connection member 290, configured to additionally engage the groove 310 of the reel 250, so as to further limit pivotal movement of the reel 250 at the rotatable axle 280. In the illustrated embodiment it may be appreciated that the reel 250 engages the rotatable axle 280 at an axle engaging portion 320, similar to the axle engaging portion 210 described above (e.g., by engaging a flanged portion 330$b$ associated with the second side 280$b$ of the rotatable axle 280). It may be appreciated that a flanged portion 330$a$ associated with the first side 280$a$ of the rotatable axle 280 may engage the housing 260 in a manner that prevents movement of the reel 250 and the rotatable axle 280 away from the housing 260, or the reel 250 may be prevented from moving away from the housing 260 by any other appropriate mechanism.

Figure 4:
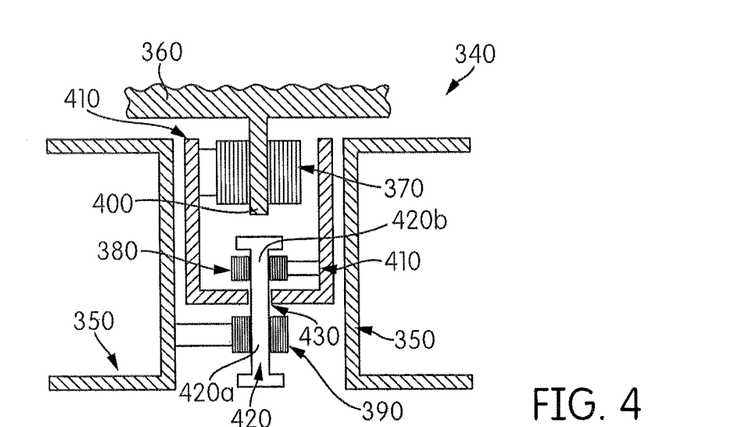
FIG. 4 illustrates a cross-sectional view of another embodiment of a reel assembly of the present disclosure.

In some embodiments, additional springs may be utilized in the reel assembly so as to further modify the retraction. In an embodiment, the additional springs may be configured to allow for longer lengths of retraction without increasing a diameter of the reel assembly. For example, FIG. 4 illustrates an embodiment of a reel assembly 340 having a reel 350 configured for rotation relative to a housing 360. As shown, the reel assembly 340 includes a first spring 370, a second spring 380 and a third spring 390. The first spring 370 is coupled to the housing 360 via a connection member 400. As in embodiments above, the connection member 400 may alternatively be integrally formed with the housing 360, or may otherwise be secured thereto. The first spring 370 is also coupled to an intermediate member 410, which further couples the first spring 370 to the second spring 380. In any of the embodiments, the connections of the ends of the springs can be direct to the remaining structure of the reel assembly (e.g., the reel, axle, and/or housing), or may be indirect, through any intermediate securement. As shown in the illustrated embodiment, the intermediate member 410 may be formed as a cup or other member configured for rotation about an axis of rotation for the reel 350. In an embodiment, the intermediate member 410 may comprise an annular configuration, or other configuration which may receive a spring between the intermediate member 410 and a rotatable axle 420, encircling the spring as the intermediate member 410 rotates about the axis of rotation. In some embodiments, the intermediate member 410 may be configured to physically separate the first spring 370 and/or the second spring 380 from the reel 350, which may prevent frictional engagement therebetween. Other configurations are alternatively possible. In the illustrated embodiment, the second spring 380 is coupled between the intermediate member 410 and the rotatable axle 420. Specifically, the second spring 380 is coupled to a first side 420$a$ of the rotatable axle 420, while the third spring 390 is coupled between a second side 420$b$ of the rotatable axle 420 and the reel 350. It may be appreciated that the rotatable axle 420 may extend through an aperture 430 formed in the intermediate member 410.

It may be appreciated that the first spring 370 and the third spring 390 may be wound in the same direction, while the second spring 380 may be wound in an opposite direction. As indicated in embodiments above, the first spring 370, the second spring 380, and the third spring 390 may therefore couple the reel 350, the intermediate member 410, and the rotatable axle 420 in a manner such that during operation of the reel assembly 340, as the reel 350 is turned, the third spring 390 may be tensioned, which in turn drives the rotatable axle 420 in the same rotational direction as the reel 350. This movement of the rotatable axle 420 is thus transferred to the second spring 380, which causes rotational movement of the intermediate member 410, which is transferred to the first spring 370, anchored to the housing 360 by the connection member 400. The tension applied through rotation of the reel 350 (e.g., to unwind a windable member thereon) is therefore transferred across the first spring 370, the second spring 380, and the third spring 390.

Figure 5:
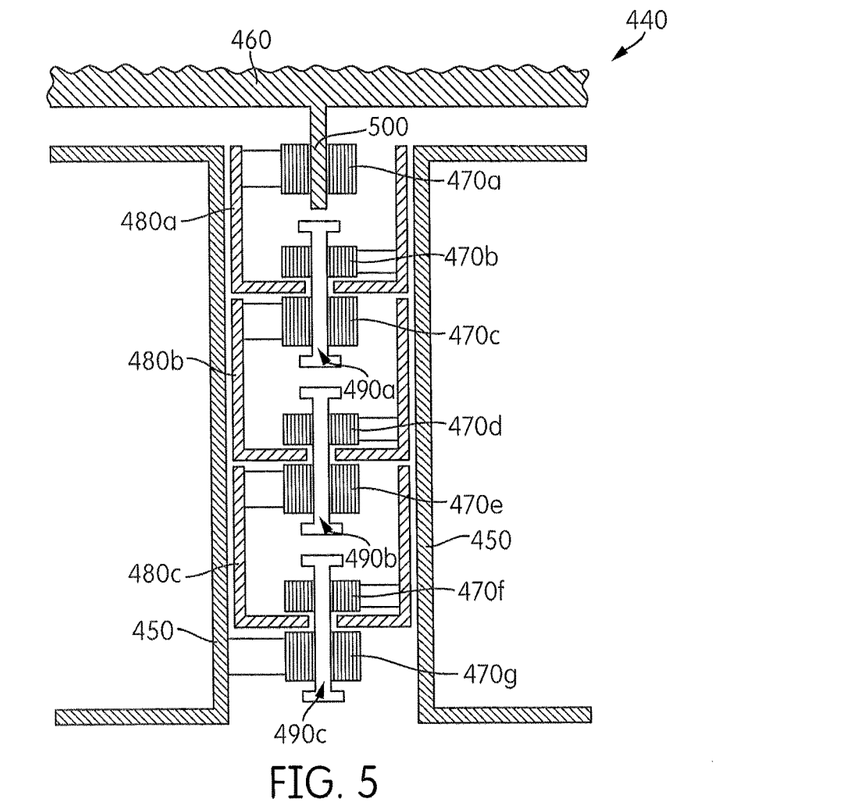
FIG. 5 illustrates a cross-sectional view of another embodiment of a reel assembly of the present disclosure.

In some embodiments, additional rotatable axles and intermediate members may be utilized, scaling the ability for the reel assembly to retract a windable member, without increasing the diameter of the assembly. For example, FIG. 5 illustrates an embodiment of a reel system 440 having a reel 450 configured for rotation relative to a housing 460. The reel system 440 includes a plurality of springs 470 (specifically springs 470$a$-$g$), a plurality of intermediate members 480 (specifically intermediate members 480$a$-$c$), and a plurality of rotatable axles 490 (specifically rotatable axles 490$a$-$c$). As shown, the spring 470$a$ couples between a connection member 500 fixed relative to (e.g., integral with) the housing 460 and the intermediate member 480$a$. The spring 470$b$ couples between the intermediate member 480$a$ and the rotatable axle 490$a$. The spring 470$c$ couples between the rotatable axle 490$a$ and the intermediate member 480$b$. The spring 470$d$ couples between the intermediate member 480$b$ and the rotatable axle 490$b$. The spring 470$d$ couples between the rotatable axle 490$b$ and the intermediate member 480$c$. Such alternate couplings between the springs 470, the intermediate members 480 and the rotatable axles 490 may continue until a terminal spring (e.g., spring 470$g$ in the illustrated embodiment) couples to the reel 450. It may be appreciated that any number of intermediary members may be utilized, and that adjacent springs 470 may be wound in opposite directions to one another, as described above. Furthermore, it may be appreciated that due to space constraints, the last spring 470 may generally be coupled between the reel 450 and one of the rotatable axles 490, however alternative configurations may be utilized depending on the configuration of the intermediate members 480.

Figure 6:
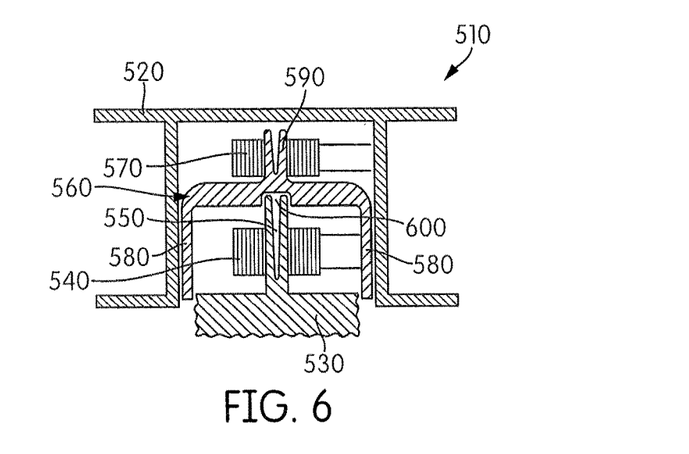
FIG. 6 illustrates a cross-sectional view of another embodiment of a reel assembly of the present disclosure.

It may be appreciated that in some embodiments, the springs may couple to spring coupling members that share the functions of both the intermediate members and the rotatable axles, as described above. For example, FIG. 6 illustrates an embodiment of a reel system 510 including a reel 520 configured to rotate relative to a housing 530. A first spring 540 is coupled between a connection member 550 fixed relative thereto (and in the illustrated embodiment, is integral therewith) and a spring coupling member 560, described in greater detail below. A second spring 570 couples between the spring coupling member 560 and the reel 520. As shown, the spring coupling member 560 may be configured with an intermediate member 580 configured to at least partially surround the first spring 540 (potentially isolating the first spring 540 from the reel 520), and an axle portion 590 extending therefrom, which may provide a mounting surface for another spring, such as the second spring 570. It may be appreciated that the intermediate member 580 and the axle portion 590 may be fixed relative to one another, and may rotate together. In some embodiments, the intermediate member 580 and the axle portion 590 of the spring coupling member 560 may be formed integral to one another (e.g., of a one-piece construction). In some embodiments, the intermediate member 580 may have an annular configuration, and may completely encircle the spring received therein (e.g., the first spring 540). As described above, the first spring 540 and the second spring 570 (as adjacent springs in the illustrated embodiment) are configured to be wound in opposite directions. The spring coupling member 560 of the illustrated embodiment is configured to rotate about the connection member 550, by including an engaging recess 600 configured to receive a protruding end of the connection member 550. As such, rotation of the reel 520 (i.e. to release lengths of the windable member received thereon) may cause tensioning of the second spring 570, transferred to the first spring 540 through rotational motion of the spring coupling member 560. Although one spring coupling member 560 is shown in the illustrated embodiment, it may be appreciated that additional spring coupling members and associated springs may be further provided in other embodiments, so as to further scale the reel system without increasing a diameter thereof. For example, in an embodiment the engaging recess 600 of one spring coupling member 560 may receive a protruding portion of the axle portion 590 of another spring coupling member 560, each with springs operatively coupled therebetween.

As indicated above, the reel assembly may be configured so that the springs thereof have different configurations. Such a varied spring configuration may provide a variable torque profile for retraction of the windable member. For example, the variable torque profile may facilitate a faster retraction of the windable member during the initial retraction, however a slower retraction of the windable member thereafter. In an embodiment, a "primary" spring having a lower initial torque potential than the other spring(s) may rotate to become predominantly compressed, with an increasing resultant torque profile as a result of such compression. When the primary spring's torque profile exceeds the other spring(s) torque potential, a subsequent spring having the current lowest torque potential, coupled to the primary spring by rotatable members such as the rotatable axle, the intermediate member, or the spring coupling members described above, may compress, increasing the subsequent spring's torque profile. Such action across a plurality of springs may therefore create a variable torque profile for the reel assembly. Accordingly, in an embodiment an initial torque of the combined primary and subsequent springs of the reel assembly may be greater than the torque of the primary spring alone.

It may be appreciated that characteristics of each spring may vary to create an associated torque profile for that spring. For example, in an embodiment inner central axis diameters of the primary and sequential springs may differ. In an embodiment, the springs may be comprised of different material types or grades. As an example, the springs may be comprised of hot or cold rolled carbon steels, heat treated carbon spring steels, stainless steel, non-metallic composites, and/or any other appropriate material. In some embodiments, the primary spring may be connected to a fixed axis (e.g., the connection member, as described above), while the subsequent spring(s) may be connected to a non-fixed axis (e.g.; the rotatable axle, the intermediate member, or the spring coupling members, as described above). In an embodiment, a cross sectional area or volume of the primary spring may be different from that of a sequential spring. In an embodiment, the springs may be of different lengths (e.g., the primary spring may be of a different length than the subsequent spring or springs). As one non-limiting example, one spring may be 80" in length, while another may be 130" in length, which may provide a combined length for the spring system of 250". Other difference between the springs of the reel assembly may also vary the torque profile of each spring and of the reel assembly as a whole, and may be implemented in other embodiments.

In some embodiments, two or more springs may be wound concentric to the same axis in alternating layers (e.g., with adjacent springs wound oppositely to one another). For example, if a first spring is 100" in length, and a second spring is 100" in length, with the first spring and the second spring (i.e., the primary springs) wound in opposite directions, then one or more additional springs (e.g., a third spring) could be coupled to the first spring and the second spring. In an example, the third spring could have a length shorter than that of the first spring and the second spring (e.g., 30" in length). The third spring may be coupled to either the first spring or the second spring, with a first end connected to the axle, and the second end not being fixed, but instead being captured between coins of the first spring or the second spring. The coupling of the third spring in this manner may be beneficial because it may add additional spring torque to the initial toque winds and profile associated with the first spring or the second spring (which generally has the lowest torque profile for a spring), and thus may create a more constant force torque profile. It may be appreciated that the third spring may in some embodiments comprise a separate spring, or in other embodiments may be formed by extending one of the primary springs to form a "tail" that may be wound back (e.g., looped or folded) over the other of the primary springs, as inter-engaging springs in alternating layers. As such, it may be appreciated that the primary springs may be of different lengths from each other, or from one or more sequential springs.

As noted above, the springs utilized in various embodiments above may be of different constructions or configurations, including but not limited to being of different material choices. It may be appreciated that the materials utilized in the reel assemblies described herein may be of different constructions or configurations in various embodiments. For example, the housing, the reel, the windable member, the springs, and/or appurtenant structures associated therewith may each be constructed from a variety of materials, including but not limited to plastic, metal, rubber, elastomer, or any other appropriate material choice.

In some embodiments, one or more of the components disclosed herein, such as the tape, the housing (and its opening), the axle, or so on, can be made in accordance with the teachings of U.S. Pat. No. 6,643,947, incorporated herein by reference in its entirety.

It may be appreciated that the teachings disclosed herein may alternatively be utilized in other contexts, with other windable materials that do not have gradations thereon. For example, the material(s) wound around the reel utilizing the teachings herein may include cables, cords, wires, ropes, tubes, twine, or any other extendable and retractable medium. Specifically, in some embodiments, the teachings disclosed herein may be extended to reels configured to house power/electrical cables, data cables (e.g., phone, network, and peripheral cables), hoses/tubes, chalk reels, fishing line, and so on.

Although the present patent application has been described in detail for the purpose of illustration based on what is currently considered to be the most practical and preferred embodiments, it is to be understood that such detail is solely for that purpose and that the present patent application is not limited to the disclosed embodiments, but, on the contrary, is intended to cover modifications and equivalent arrangements that are within the spirit and scope of the appended claims. For example, it is to be understood that the present patent application contemplates that, to the extent possible, one or more features of any embodiment can be combined with one or more features of any other embodiment.

What is claimed is:

1. A reel assembly comprising:
   a housing having a fixed connection portion, the fixed connection portion being fixed from rotation relative to the housing;
   an axle within the housing, the axle configured to rotate about an axis of rotation;
   a reel within the housing, the reel configured to rotate about the axis of rotation and the axle;
   a first spring coupled between the axle and the fixed connection portion of the housing; and
   a second spring coupled between the axle and the reel, the second spring having a torque profile associated therewith different from a torque profile of the first spring;
   wherein rotation of the reel relative to the housing in a direction tending to tension the second spring transmits rotational movement to the axle through the tensioning of the second spring, and wherein such rotational movement of the axle is applied to the first spring to tension the first spring.

2. The reel assembly of claim 1, wherein one or more of the first spring and the second spring is at least partially positioned outside of a volume defined by the reel.

3. The reel assembly of claim 1, further comprising one or more additional springs coupled between the first spring and the second spring.

4. The reel assembly of claim 3, further comprising an intermediate member coupled between one of the one or more additional springs and the axle.

5. The reel assembly of claim 4, wherein the first spring is coupled to the axle by the intermediate member and the one of the one or more additional springs.

6. The reel assembly of claim 3, wherein the axle is part of a spring coupler further comprising an intermediate member, wherein one of the first spring, the second spring, and the one or more additional springs is fixed to the axle, and another of the first spring, the second spring, and the one or more additional springs is fixed to the intermediate member, wherein the intermediate member is configured to encircle the another of the first spring, the second spring, and the one or more additional springs during rotation about the axis of rotation.

7. The reel assembly of claim 6, further comprising another spring coupler, wherein the one or more additional springs comprises a third spring, and wherein the third spring is coupled between the axle of the spring coupler and an intermediate member of the another spring coupler.

8. The reel assembly of claim 1, wherein the connection portion is integral with the housing, or is separate from and attached to the housing.

9. The reel assembly of claim 1, further comprising one or more additional axles coupled to the first spring or the second spring by one or more additional springs.

10. The reel assembly of claim 9, wherein adjacent ones of the first spring, the second spring, and the one or more additional springs are wound opposite to each another.

11. A reel assembly comprising:
    a housing having a fixed connection portion, the fixed connection portion being fixed from rotation relative to the housing;
    a reel configured to rotate relative to the housing;
    a first spring coupled between the fixed connection portion and a spring coupler;
    a second spring coupled between the spring coupler and the reel;
    wherein the spring coupler comprises:
       an intermediate member configured to at least partially surround the first spring; and
       an axle portion extending from the intermediate member, the axle portion providing a mounting surface for the second spring;
    wherein rotation of the reel relative to the housing in a direction tending to tension the second spring transmits rotational movement to the spring coupler and the intermediate member thereof through the tensioning of the second spring, and wherein such rotational movement of the spring coupler is applied to the first spring to tension the first spring.

12. The reel assembly of claim 11, wherein the axle portion and the intermediate member are integrally formed.

13. The reel assembly of claim 11, wherein one or more of the first spring and the second spring is at least partially positioned outside of a volume defined by the reel.

14. The reel assembly of claim 11, wherein the rotation of the reel also causes associated rotational movement of the second spring and the first spring, and wherein the rotational movement of the second spring is applied to the first spring through the spring coupler.

15. The reel assembly of claim 11, wherein the connection portion is integral with the housing, or is separate from and attached to the housing.

16. The reel assembly of claim 11, further comprising one or more additional springs coupled between the first spring and the second spring.

17. The reel assembly of claim 11, further comprising one or more additional axles coupled to the first spring or the second spring by one or more additional springs.

18. The reel assembly of claim 17, wherein adjacent ones of the first spring, the second spring, and the one or more additional springs are wound opposite to each another.

19. A measuring tape rule device comprising:
    a reel;
    a first spring;
    a second spring;
    a coupler coupled between the first spring and the second spring; and
    a tape blade having gradations thereon and wound on the reel;
    wherein extension or retraction of the tape blade causes associated rotational movement of the reel, the first spring, the second spring, and the coupler, and
    wherein the rotational movement of the second spring is applied to the first spring through the coupler.

20. The measuring tape rule device of claim 19, wherein rotation of the reel, during the retraction of the tape blade, is configured to cause tensioning in the second spring, transferred to the first spring through the rotational movement of the coupler.

* * * * *